UNITED STATES PATENT OFFICE.

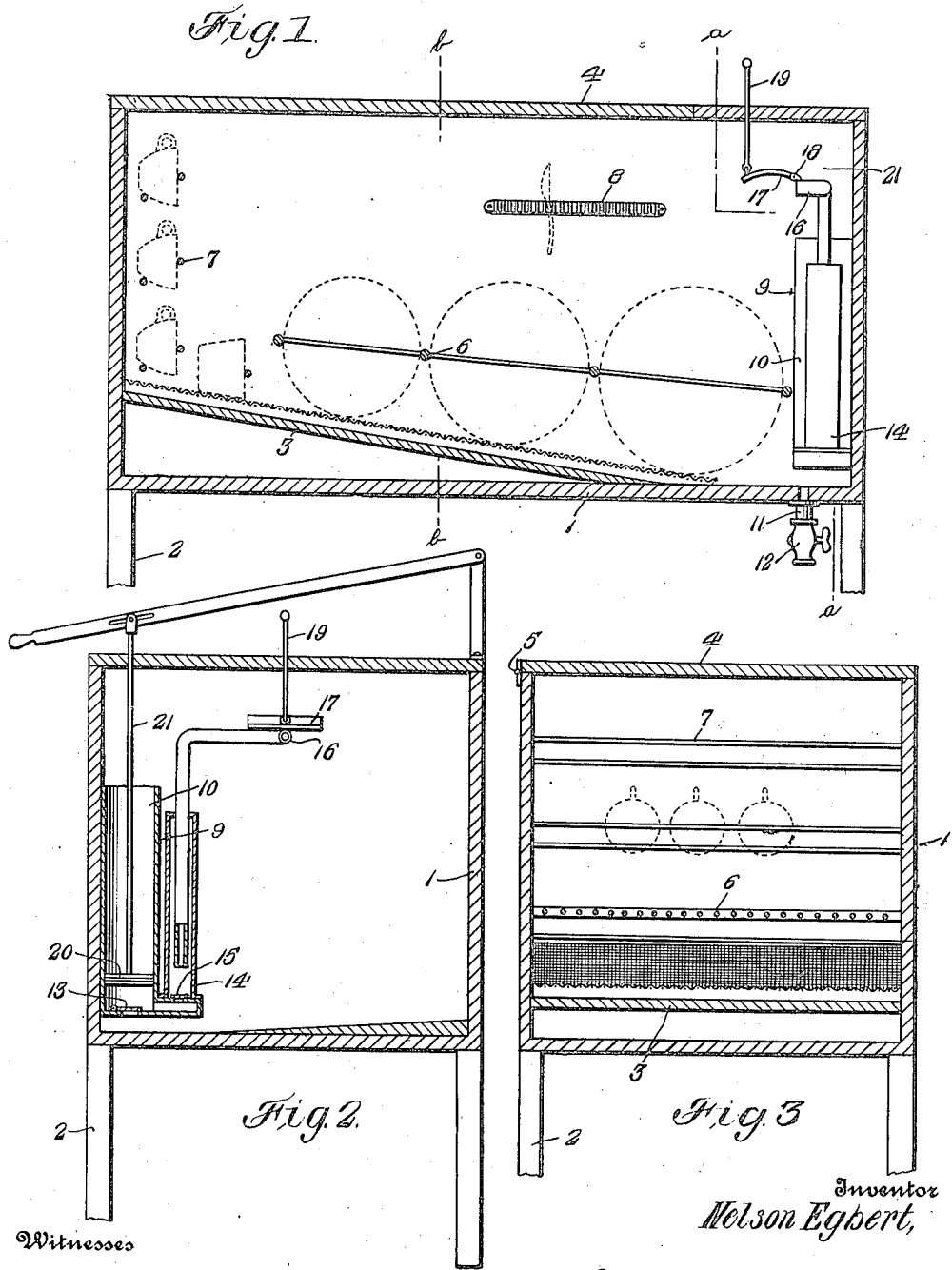

NELSON EGBERT, OF VALOIS, NEW YORK.

DISH-WASHING MACHINE.

1,172,201.   Specification of Letters Patent.   Patented Feb. 15, 1916.

Application filed September 10, 1915. Serial No. 50,089.

*To all whom it may concern:*

Be it known that I, NELSON EGBERT, a citizen of the United States, residing at Valois, in the county of Schuyler and State of New York, have invented new and useful Improvements in Dish-Washing Machines, of which the following is a specification.

This invention is an improved dish washing machine adapted for family use, and also for hotels and other like places, the object of the invention being to provide an improved machine of this character which is cheap and simple in construction, which is compact and portable and by means of which dishes and the like may be readily washed and dried and without the necessity of being wiped.

The invention consists in the construction, combination and arrangement of devices hereinafter described and claimed.

In the accompanying drawings:—Figure 1 is a vertical longitudinal sectional view of a dish washing machine constructed in accordance with my invention. Fig. 2 is a transverse sectional view of the same on the plane indicated by the line *a—a* of Fig. 1. Fig. 3 is a similar view on the plane indicated by the line *b—b* of Fig. 1.

The body 1 of the machine is here shown as of oblong, rectangular form but may be of any suitable shape. The body may be made of wood or other suitable material. Supporting legs 2 are provided which are arranged in the corners and in the body is an inclined false bottom 3 the lower end of which is near and spaced from one end of the body. The cover 4 is hinged at one side as at 5. Bars 6 extend transversely across the body at suitable distances apart, the plates, saucers and other like dishes being adapted to be stood on edge and arranged between the said bars and held in place, in vertical position, for washing, as illustrated. Near the top of the body are suitable supports 7 for cups and other like articles. Racks 8 for holding knives, forks and spoons are also provided and arranged at one side of the body.

A pump 9 has a vertical barrel 10 which is arranged near the front end of the body and between said end and the lower end of the false bottom 3. A spout 11 is provided in the bottom of the body near the pump and has a suitable valve 12. The pump barrel 10 has an upwardly opening valve 13 in the bottom and at one side of the pump barrel at the lower end thereof is a spout 14 in the bottom of which is an upwardly opening valve 15. The upper end of the spout is arranged midway between the sides of the body and near the top thereof and is extended forwardly and upwardly as at 16. A deflector 17 is also provided which is pivotally connected as at 18 to the upper side of the spout 16 at the discharge end thereof and has an operating rod 19 which passes up through an opening in the cover of the body and which may be manipulated as desired. The plunger 20 of the pump is here shown as a solid plunger having a suitable packing and is provided with a plunger rod 21 which passes up through the pump barrel and operates in an opening in the cover and may be readily manually operated to cause the pump to force hot water through the spout, the deflector 17 being operated by means of the rod 19 to direct the stream of hot water over the plates, cups, saucers, dishes and the like in all parts of the body as required to effectually cleanse them.

The hot water is first placed in the body, the valve 12 being closed. When the pump is operated the hot water is applied directly to the dishes, thus thoroughly washing them and returns back to the lower portion of the body and when the dishes have been sufficiently washed the hot water may be discharged from the body together with the washings from the dishes, by opening the valve 12, a suitable pail or other receptacle being provided to receive the dish water. By keeping the cover closed while washing the dishes and then immediately, after drawing off the water, opening the lid the dishes will be steamed off and become perfectly dried and clean without the necessity of wiping them. My improved dish washing machine enables the dishes to be washed readily, rapidly and thoroughly, the dishes for an ordinary family to be done in a very few minutes and the use of the machine effects a great saving of labor and time.

Having thus described my invention, I claim:—

The herein described dish washing machine comprising a body having an inclined bottom and a valved draining spout and also provided with a fixed covering portion and with a removable cover, a pump arranged in the body under the fixed covering portion and having a discharge spout, a deflector for directing the water discharged from the spout to any desired portion of the body, said deflector being pivotally connected to the spout at the upper side and discharging end of the latter, and a rod for operating and holding the deflector, said rod being attached to the deflector and extending through an opening in the fixed portion of the cover.

In testimony whereof I affix my signature in presence of two witnesses.

NELSON EGBERT.

Witnesses:
FRANK MATHEWS.
C. EARLE HAGER.